(12) United States Patent
Radke et al.

(10) Patent No.: US 7,451,840 B2
(45) Date of Patent: Nov. 18, 2008

(54) ARTICULATED CRAWLER DOZER WITH DIRECT LOAD PATH STRUCTURE

(75) Inventors: Daniel Dean Radke, Dubuque, IA (US); James Arthur Nagorcka, Tarrington Victoria (AU); Lyal Douglas Allen, Hamilton Victoria (AU)

(73) Assignee: Deere & Company, Moline, IL (US)

( * ) Notice: Subject to any disclaimer, the term of this patent is extended or adjusted under 35 U.S.C. 154(b) by 385 days.

(21) Appl. No.: 11/286,733

(22) Filed: Nov. 23, 2005

(65) Prior Publication Data

US 2006/0124380 A1 Jun. 15, 2006

Related U.S. Application Data

(60) Provisional application No. 60/631,557, filed on Nov. 29, 2004.

(51) Int. Cl.
B62D 55/065 (2006.01)
(52) U.S. Cl. .......................... 180/9.44; 37/366
(58) Field of Classification Search ................ 180/9.44, 180/6.64; 280/461.1; 37/366
See application file for complete search history.

(56) References Cited

U.S. PATENT DOCUMENTS

| | | | |
|---|---|---|---|
| 3,763,938 A | 10/1973 | Brodersen | 172/789 |
| 3,899,028 A | 8/1975 | Morris et al. | 172/4.5 |
| 3,907,041 A | 9/1975 | Manor | 172/780 |
| 3,974,699 A | 8/1976 | Morris et al. | 73/432 |
| 3,986,563 A | 10/1976 | Stubben | 172/793 |
| 4,053,017 A | 10/1977 | Gill et al. | 172/4.5 |
| 4,061,194 A | 12/1977 | McCanse | 172/447 |
| 4,088,236 A | 5/1978 | Moore | 214/90 |
| 4,124,080 A | 11/1978 | McCanse | 172/447 |
| 4,213,507 A | 7/1980 | Horrer et al. | 172/784 |
| 4,290,622 A * | 9/1981 | Horvath | 280/400 |
| 4,340,126 A | 7/1982 | Larson | 180/305 |
| 4,635,730 A | 1/1987 | Larsson | 172/788 |
| 4,696,350 A | 9/1987 | Ruhter et al. | 172/793 |
| 4,807,461 A | 2/1989 | Brimeyer et al. | 172/793 |
| 4,966,242 A * | 10/1990 | Baillargeon | 180/9.44 |
| 5,074,061 A | 12/1991 | Thompson | 37/129 |
| 5,113,958 A * | 5/1992 | Holden | 180/9.4 |
| 5,180,028 A * | 1/1993 | Perrenoud, Jr. | 180/235 |
| 5,373,909 A * | 12/1994 | Dow et al. | 180/9.1 |
| 5,533,587 A * | 7/1996 | Dow et al. | 180/235 |
| 5,549,412 A | 8/1996 | Malone | 404/84.1 |

(Continued)

Primary Examiner—Kevin Hurley

(57) ABSTRACT

An articulated loader has an articulated chassis, two A-frames, and four track assemblies. A narrow portion each of the A-frames faces a narrow portion of the other A-frame. The articulated chassis includes a front portion and a rear portion. Likewise, there is a front or first A-frame and a rear or second A-frame. The A-frames are connected to the overall chassis at points close to but offset from the point of vehicle articulation via ball joints and via hydraulic suspension cylinders toward the wider portions of the "A"s. The chassis of the vehicle is suspended above the first and second A-frames. The vehicle is propelled along the ground by tracks that are independently suspended. The bulk of the load from the blade, i.e., the blade load, is transferred directly to the tracks via the first and second Aframes; the first and second ball joints and pivot connections between the first and second A-frames and the track frames for each track assembly. Thus the chassis sees little of the blade load allowing for a lighter, less bulky vehicle.

7 Claims, 6 Drawing Sheets

U.S. PATENT DOCUMENTS

| | | | |
|---|---|---|---|
| 5,632,350 A * | 5/1997 | Gauvin | 180/9.44 |
| 5,762,446 A | 6/1998 | Manatt et al. | 404/75 |
| 5,775,438 A | 7/1998 | Confoey et al. | 172/831 |
| 5,921,706 A | 7/1999 | Manatt et al. | 404/72 |
| 6,322,287 B1 | 11/2001 | Yelton | 404/118 |
| 6,382,873 B1 | 5/2002 | Mulders et al. | 404/128 |
| 6,691,795 B2 | 2/2004 | L'Abbe | 172/787 |
| 6,810,975 B2 * | 11/2004 | Nagorcka et al. | 180/9.5 |
| 7,192,034 B2 * | 3/2007 | Radke et al. | 280/6.159 |
| 2002/0162669 A1 | 11/2002 | L'abbe | 172/787 |

* cited by examiner

ARTICULATED CRAWLER DOZER WITH DIRECT LOAD PATH STRUCTURE

This document claims priority based on U.S. provisional; application Ser. No. 60/631,557, filed Nov. 29, 2004, and entitled DIRECT LOAD PATH STRUCTURE, under 35 U.S.C. 119(e).

FIELD OF THE INVENTION

This applies to an articulated crawler dozer. In the particular configuration disclosed, four track systems are mounted such that they can move in a way that they can follow the contour of the ground.

BACKGROUND OF THE INVENTION

Conventional construction vehicles (dozers, loaders, backhoes, skid steers, graders, etc) do not usually have cushioning suspension systems but, at most, are equipped with pneumatic tires. The consequence is that the machine ride can be very harsh dependant upon the operating conditions of the machine. Presented herein is an articulated dozer with an independent suspension system that reduces the harshness of the ride.

One concern with suspension systems is the undesired forces and motions that can result because of the addition of the systems as compared to a rigid mounted system. An example is the vertical motion observed when a Semi-tractor trailer combination accelerates from a stop light. Another example is the squat observed in the rear axle of a 1980's Datsun 280ZX or other car with certain independent rear axle suspension systems. This movement could be detrimental to the ability of a grading machine to perform its required task. Thus, the addition of suspension to a machine such as this creates a situation that can be counter to the desired conditions stated above.

Additionally, suspension systems indirectly add unnecessary weight to the vehicle as the suspension system and the chassis may bear substantial portions of the blade load during work operations.

SUMMARY OF THE INVENTION

A vehicle in which the invention may be used includes a front lower A-frame and a rear lower A-frame as well as an articulated chassis having a front portion connected to a rear portion via an articulation joint. The front and rear A-frames are pivotally attached to the articulatod chassis via ball joints, the point of attachment for the front lower frame being forward of the chassis articulation joint and the point of attachment for the rear lower frame being rearward of the chassis articulation joint. Relative lateral movement between the lower A-frames and the portions of the articulated chassis to which they are attached are constrained due to pan hard rod connections between the A-frames and the articulated chassis at each end of the articulated chassis. Toward each end of the chassis two suspension cylinders situated between the chassis and a wide portion of each. A-frame support the articulated chassis above the A-frames allowing relative vertical movements between the A-frames and the chassis.

The A-frames are essentially of equal length; the ball joints for the A-frame connections are located along the centerline of the vehicle; and the ball joints are positioned as close together as practical. Such a configuration results in vertical forces at the ball joint attachments to the chassis that are equal in magnitude and opposite in direction, tending to neutralize loads that would otherwise cause height variations in the chassis on acceleration/deceleration of the vehicle. The close proximity of the 2 forces results in minimal torque on the frame and decreased height variations.

The invention provides a structure for transferring blade load directly from the blade to the vehicle tracks via the two A-frames. Each of four independently driven tracks are pivotally attached to the ends of a wider portion of each of the A-frames. The blade is attached to an end of a C-frame and the C-frame is attached to the wider portion of the front A-frame providing for an improved load path in which the blade load is transferred from the blade to the C-frame and from the C-frame to the front A-frame. The bulk of the load is then transferred to the two track frames at the front of the vehicle. Most of the remaining blade load is then transferred directly through the two ball joints; through the rear A-frame; and into each of the two track frames at the rear of the vehicle. Thus, the load is transferred, in a direct manner, from the blade to the tracks of the vehicle leaving the chassis of the vehicle to bear relatively little of the blade load. The two A-frames are arranged such that they form a truss like backbone for the vehicle. Such an arrangement allows for a lower overall vehicle weight and a lowering of vehicle bulk as the load does not include indirect paths through the vehicle chassis as in conventional crawlers and graders. Such indirect load paths usually result in greater weight and bulk in chassis structures to compensate for the stresses encountered. Such a design could lead to significant cost savings.

BRIEF DESCRIPTION OF THE DRAWINGS

Embodiments of the invention will be described in detail, with references to the following figures, wherein.

DESCRIPTION OF THE ILLUSTRATED EMBODIMENT

The exemplary embodiment of the invention described herein is applied to a crawler dozer with 4 independent tracks. In this configuration, the tracks are mounted such that they can move in a way that they can follow the contour of the ground. Each of the tracks pivots about a drive wheel.

Figure 1:
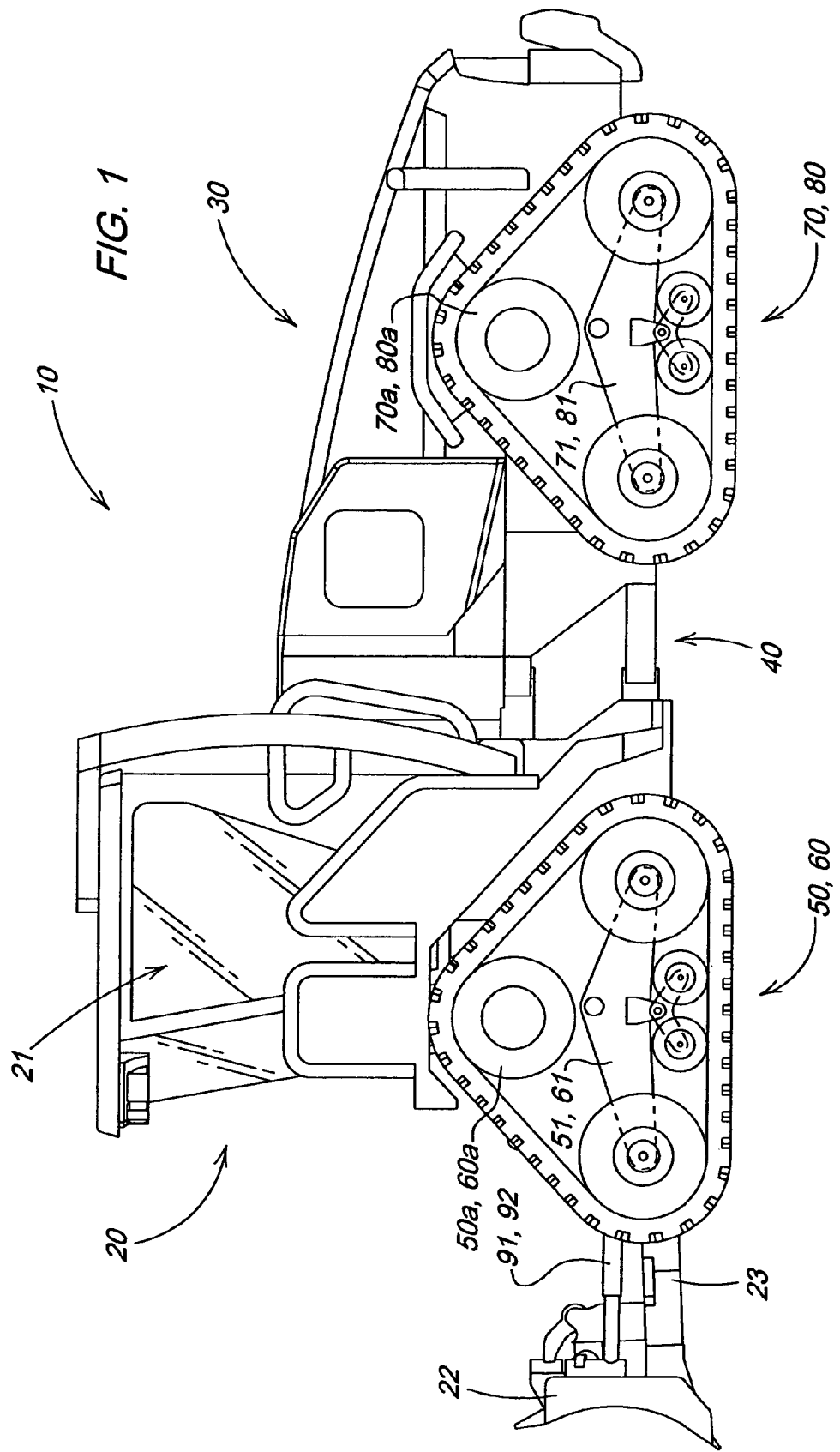
FIG. 1 is a side view of a work vehicle in which the invention may be used.

FIG. 1 illustrates a vehicle in which the invention may be used. The particular vehicle illustrated in FIG. 1 is a four track articulated dozer 10 having a front portion 20 a rear portion 30; an articulation mechanism 40 pivotally connecting the front portion 20 and the rear portion 30; first and second track systems 50, 60; and third and fourth track systems 70, 80. The front portion 20 includes a blade 22 and a blade mounting frame 23 as well as an operator cab 21.

Figure 2:
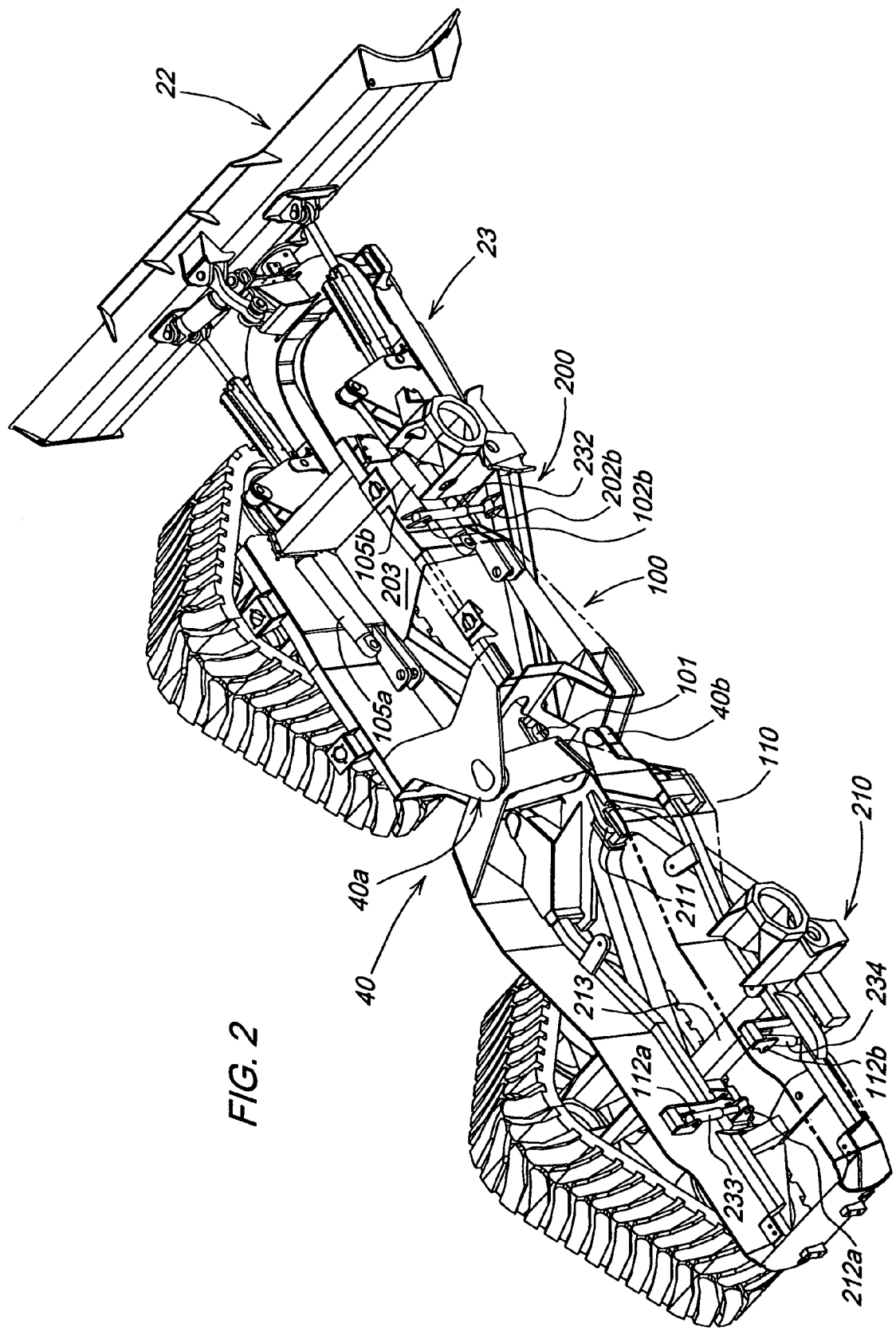
FIG. 2 is an elevated oblique view of an articulated chassis, two A-frames and C-frame of the vehicle illustrated in FIG. 1.
Figure 3:
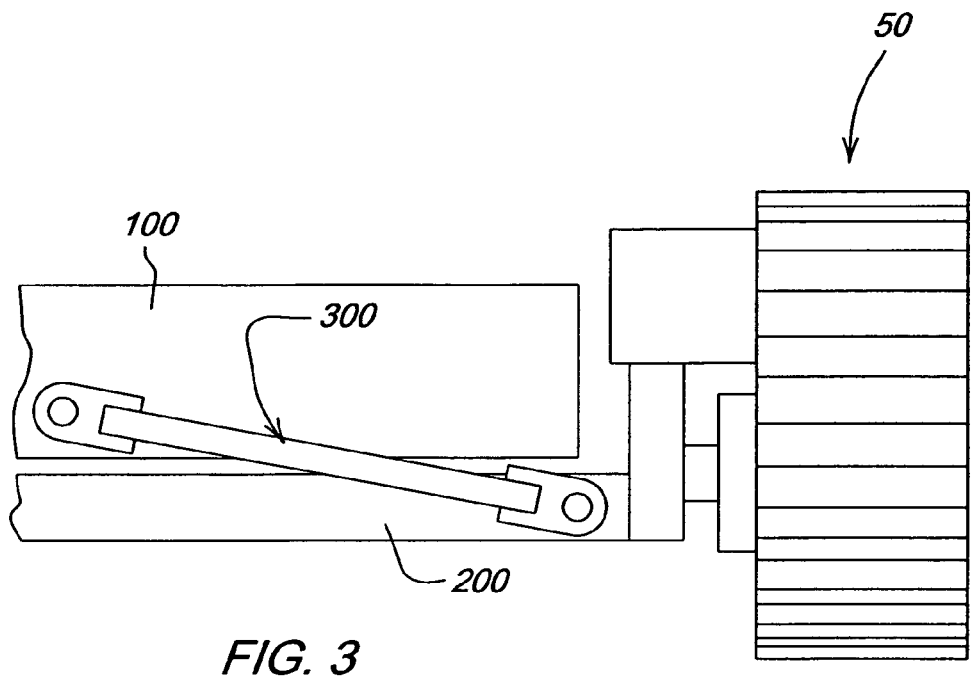
FIG. 3 is a front view of a front portion of the chassis and a first A-frame connected by a pan hard rod.
Figure 4:
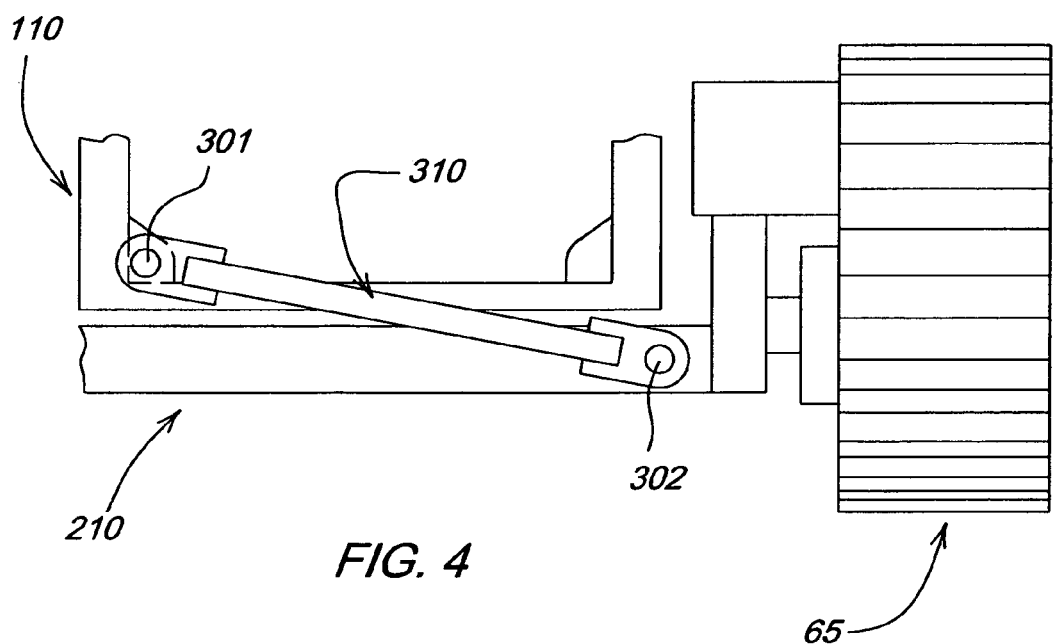
FIG. 4 is a rear view of a rear portion of the chassis and a second A-frame connected by a pan hard rod.
Figure 5:
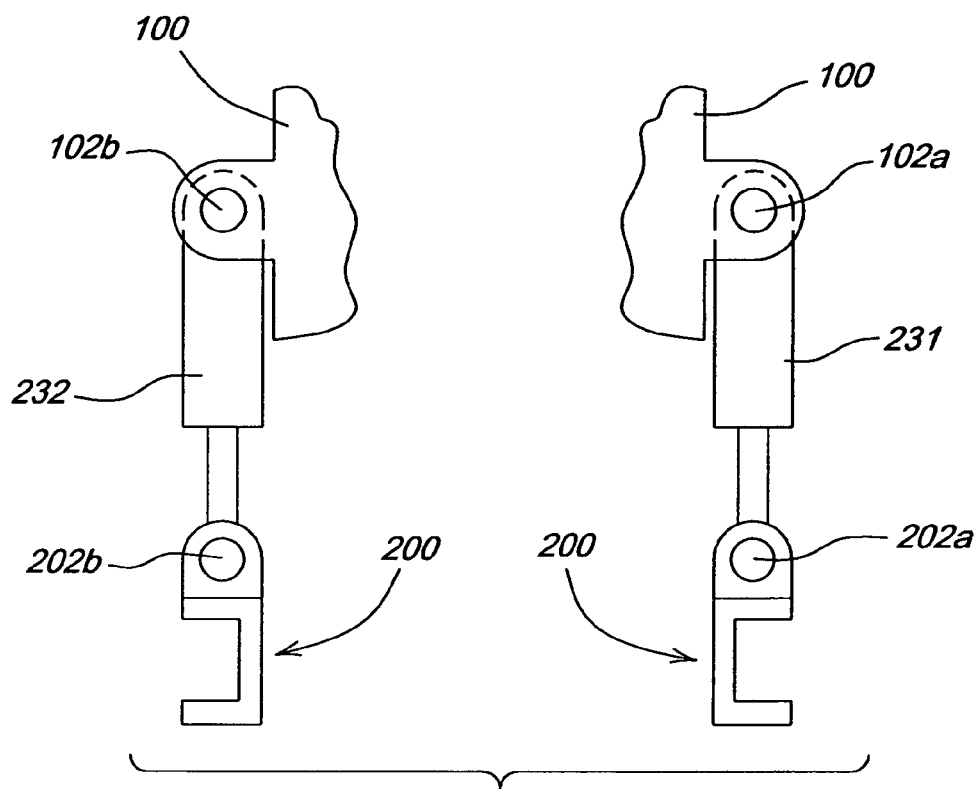
FIG. 5 is a front view of the front portion of the chassis and the first A-frame connected by two suspension cylinders.
Figure 6:
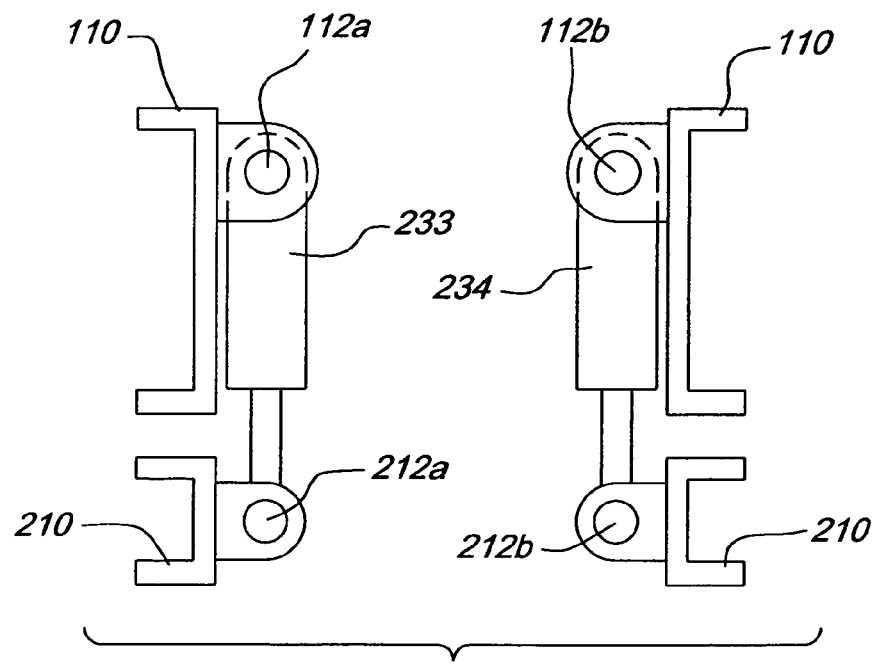
FIG. 6 is a rear view of a rear portion of the chassis and a second A-frame connected by two suspension cylinders.
Figure 7:
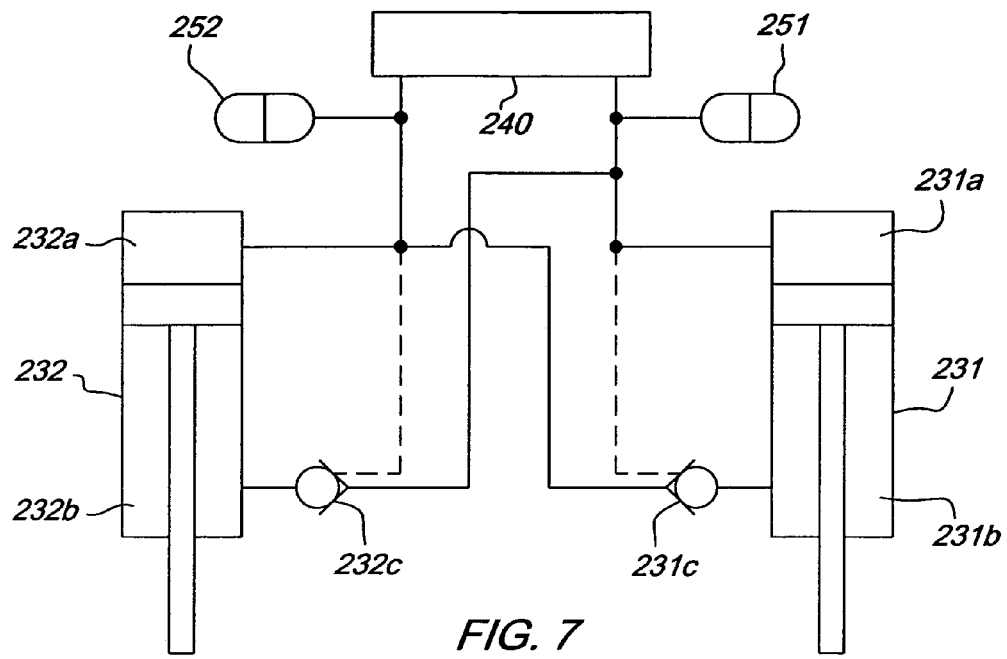
FIG. 7 is an exemplary schematic of the cylinders illustrated in FIG. 5.
Figure 8:
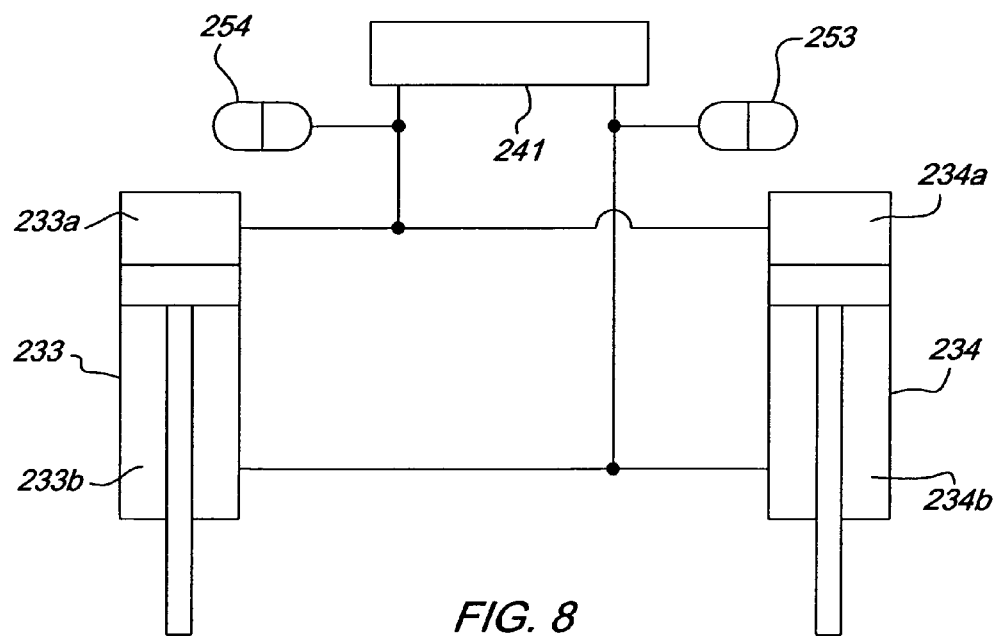
FIG. 8 is an exemplary schematic of the cylinders illustrated in FIG. 6.
Figure 9:
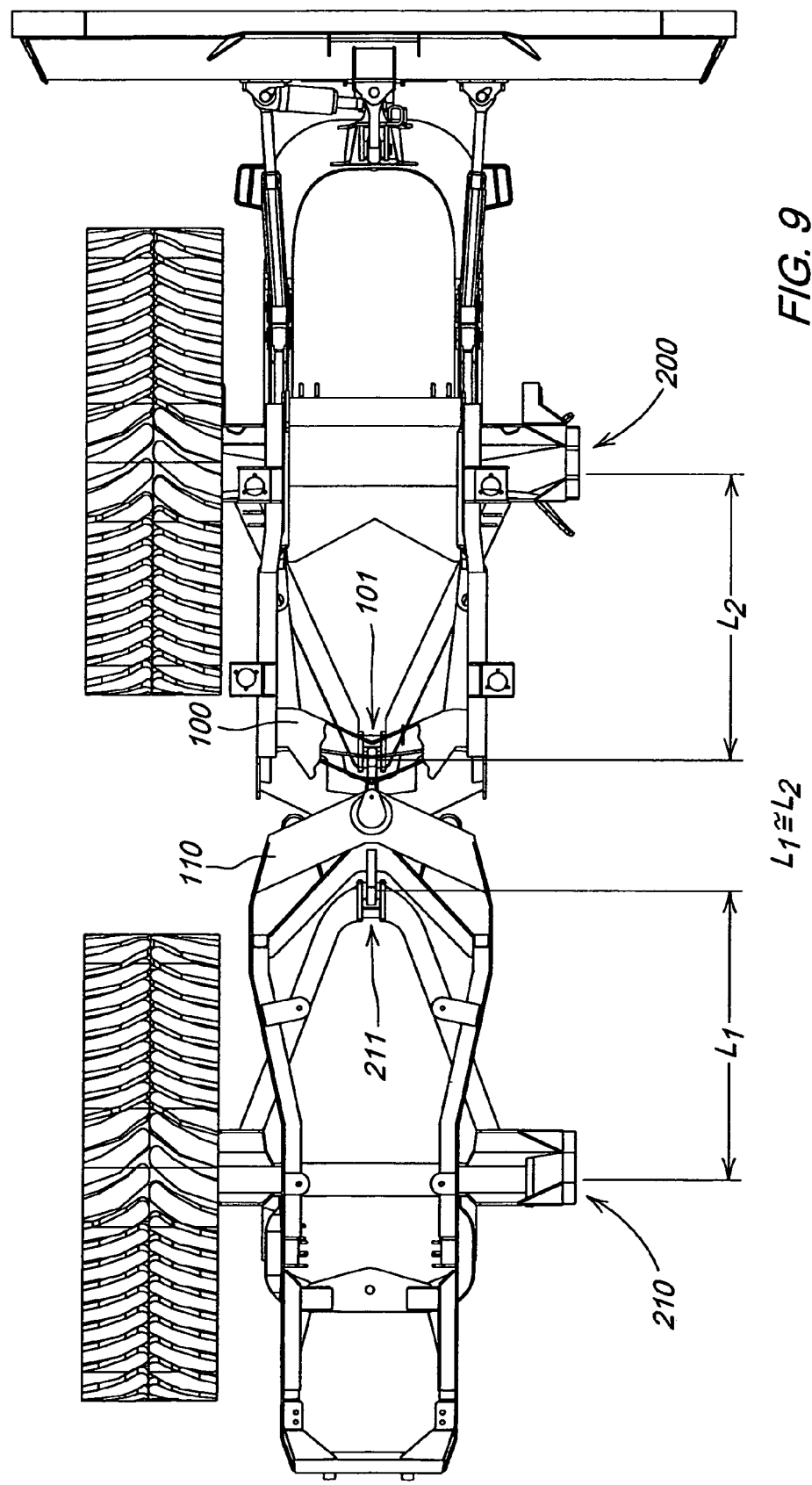
FIG. 9 is a plan view of the vehicle chassis and A-frames illustrated in FIG. 2, showing the relative lengths of the A-frames.

As illustrated in FIGS. 2 and 9, a first chassis support frame, i.e., exemplarily, first A-frame 200 is pivotally connected to both the first and second track frames or rocker arms 51, 61. This first A-frame is connected to a first chassis portion 100 primarily at the top of the "A", i.e., at a narrower portion of the first A-frame 200 with a first spherical ball joint 101. The first spherical ball joint 101 is located in proximity to but forward of the articulation joint 40. Laterally the A-frame 200 is connected to the first chassis portion 100 with a first linkage (first pan-hard rod) 300 (see FIG. 3) to keep the position of the first A-frame 200 approximately centered under the front chassis portion 100. The front chassis portion 100 is vertically connected to the first A-frame by a first suspension cylinder 231 and a second suspension cylinder 232. As illustrated in FIG. 7, the first and second suspension cylinders 231, 232 are attached to first and second hydraulic accumulators, 251, 252. A mechanism senses the position of the first A-frame 200 relative to the first chassis portion 100 at each cylinder location, an controls the vehicle height, via hydraulic balancing circuit 240, by adding or removing hydraulic fluid from the cylinder system on a continuous basis. These cylinders primarily support a front portion of the vehicle weight.

It is also desired to control vehicle roll position at this front axle 203. To accomplish this, the head end of the first cylinder 231 is hydraulically connected to the rod end of the second cylinder 232. Conversely the head end of the second cylinder 232 is hydraulically connected to the rod end of the first cylinder 231. This methodology reduces the effective cylinder area to be equal to the rod area of the cylinder. This creates a higher pressure in the system which is desirous for improved suspension control.

The first and second suspension cylinders 231, 232 are attached to the first A-frame 200 at a point behind respective track frame pivots 51a, 61a so that they operate at an increased pressure level. This helps contribute to the roll stability mentioned above by increasing the pressure proportionally.

A second chassis support frame, i.e., exemplarily, second A-frame structure 210 is pivotally connected to both the third and fourth track frames, i.e., rocker arms 71, 81. This A-frame 210 is connected to a rear chassis portion 110 primarily at the top of the "A", i.e., at a narrower portion of the second A-frame 210, with a spherical ball joint 211. This point is located in proximity to but rearward of the articulation joint 40. Laterally the second A-frame 210 is connected to the rear chassis portion 110 with a linkage (pan-hard rod) 310 to keep the second A-frame 210 approximately centered under the rear chassis portion 110. The rear chassis portion 110 is vertically connected to the second A-frame 210 by two third and fourth suspension cylinders 233, 234, one on the left and one the right side of the vehicle. These suspension cylinders 233, 234 are hydraulically connected together and are attached to respective third and fourth hydraulic accumulators 253, 254. A mechanism senses the position of the second A-frame 210 relative to the second chassis portion 110 at a point midway between the third and fourth suspension cylinders 233, 234 indicating the average location, and controls the vehicle height, via hydraulic balancing circuit 241, by adding or removing hydraulic fluid from the cylinder system on a continuous basis.

It is desired to have the rear axle oscillate to ensure all 4 tracks maintain ground contact at all times. This is done by connecting the head end of the third and fourth suspension cylinders 233, 234 together to allow oil to flow from one to the other as needed. The rod ends of the third and fourth suspension cylinders 233, 234 are also connected together likewise.

As illustrated in FIG. 2, the third and fourth suspension cylinders 233, 234 are attached to the second A-frame 210 at a point behind rocker arm pivots 71, 81 so that they operate at a reduced pressure level. This lowers the pressure of the system for a smoother ride.

First and second balancing circuits 240, 241 are hydraulic circuits that maintain the nominal distances between the front chassis portion 100 and the front A-frame 200 and the rear chassis portion 110 and the rear A-frame 210.

As illustrated in FIGS. 2 and 9, a blade mounting structure, referred to as C-Frame 23, is operatively attached to the first A-Frame 200. This ensures the blade level (right to left with respect to the operator) will be consistent with the tracks and not affected by vehicle chassis motion enabled by the suspension system motion. The blade 22 and C-frame 23 are arranged such that the load transfers to the front A-frame 200 in, generally, a direct manner with little moment. Much of the load is then transferred to the first and second track systems 50, 60 via track frame pivots 51a, 61a and the first A-frame 200. Most of the remaining load is then transferred to the second A-frame 210, via the first ball joint 201 and the second ball joint 211, and into the third and fourth track systems 70, 80 via third and fourth track frame pivots 61a, 71a and the second A-frame 210. The front and rear chassis portions 100 and 110 are attached to the C-frame 23 only through the controlling cylinders 105a and 105b.

As illustrated in FIG. 9, the first A-frame 200 and the second A-frame 210 are of approximate equal lengths along the centerline of the articulated dozer 10. Further the respective first and second ball joints 201, 211 are positioned as closely as practical to the articulation joint 40. During grading operations of the vehicle 10, tractive efforts tend to vary and to, thereby, generate vertical loads at the first and second ball joint 201, 211. As a result of this structure, the vertical forces generated at the ball joint attachments to the chassis for each of the A-frames due to variations in tractive efforts tend to be equal in magnitude and opposite in direction and to result in minimal torque on the frame. Thus height variations due to variations in tractive efforts decrease. This tends to improve the directness of the blade load path.

Having described the illustrated embodiment, it will become apparent that various modifications can be made without departing from the scope of the invention as defined in the accompanying claims.

The invention claimed is:

1. An articulated dozer, comprising:
a blade;
a C-frame, the blade operatively connected to the C-frame;
a front chassis portion;
a rear chassis portion connected to the front chassis portion via an articulation joint;
a first A-frame;
a second A-frame, a length of the second A-frame being approximately equal to a length of the first A-frame, the front chassis portion and the rear chassis portion, respectively suspended above the first and second A-frames;
a first ball joint; and
a second ball joint, a narrow portion of the first A-frame connected to the front chassis portion via the first ball joint, a narrow portion of the second A-frame connected to the rear chassis via the second ball joint, the first ball joint and the second ball joint in proximity to the articulation joint;
a first track system pivotally attached to a first side of a wide portion of the first A-frame;

a second track system pivotally attached to a second side of the wide portion of the first A-frame, the C-frame connected to the first A-frame;

a third track system pivotally attached to a first side of a wide portion of the second A-frame;

a fourth track system pivotally attached to a second side of the wide portion of the second A-frame, a greater portion of a blade load transferring directly to the first and second track systems via the C-frame and the first A-frame, a remainder of the blade load transferring directly to the third and forth track systems via the first ball joint, the second ball joint and the second A-frame.

2. The articulated dozer of claim 1, wherein a greater portion of a blade load transfers directly to the first and second track systems via the C-frame and the first A-frame, a reminder of the blade load transferring directly to the third and fourth track systems via the first ball joint, the second ball joint and the second A-frame.

3. An articulated dozer, comprising:
a blade;
a blade mounting structure, the blade operatively connected to the blade support frame;
a first chassis portion;
an articulation joint;
a second chassis portion connected to the first chassis portion via the articulation joint;
a first chassis support frame;
a second chassis support frame, a length of the second support frame being approximately equal to a length of the first support frame, the first chassis portion and the second chassis portion, respectively suspended above the first and second chassis support frames, the first chassis support frame pivotally attached to the first chassis portion in proximity to the articulation joint, the second support frame pivotally attached to the second chassis portion in proximity to the articulation joint;
a first track system pivotally attached to a first side of the first chassis support frame;
a second track system pivotally attached to a second side of the first chassis support frame, the blade support frame connected to the first support frame;
a third track system pivotally attached to a first side of the second support frame;
a fourth track system pivotally attached to a second side of the second support frame.

4. The articulated dozer of claim 3, wherein a greater portion of a blade load transfers directly to the first and second track systems via the blade mounting structure and the first chassis support frame, a remainder of the blade load transferring directly to the second chassis support frame and the third and fourth track systems.

5. The articulated dozer of claim 3, wherein the first chassis support frame comprises a first A-frame.

6. The articulated dozer of claim 4, wherein the second chassis support frame comprises a second A-frame.

7. The articulated dozer of claim 3, wherein the blade mounting structure comprises a C-frame.

* * * * *